United States Patent Office 2,854,441
Patented Sept. 30, 1958

2,854,441
WATER-SOLUBLE METAL COMPOUNDS AND PROCESS FOR MAKING SAME

Meyer Mendelsohn, New York, N. Y., assignor to Ions Exchange & Chemical Corp., New York, N. Y., a corporation of New York No Drawing. Application November 16, 1953
Serial No. 392,517

11 Claims. (Cl. 260—91.3)

My present invention relates to the production of metal compounds of high polymers as disclosed, for example, in my co-pending applications Ser. Nos. 331,325, filed January 14, 1953, and 345,741, filed March 30, 1953, now abandoned.

In the preparation of metal salts, especially silver salts, of water-soluble materials, such as the polyvinyl alcohol salts described in the aforesaid applications, difficulties are encountered because of the solubility of the treated material in an aqueous medium. As a result of this solubility, comminuted materials had to be separated laboriously, by dialysis, from the nitric components whereas the treatment of sheet materials was limited to short-time immersions at low temperatures with consequent low silver content.

My present invention has for its object the provision of an improved process for reacting a salt of a preferably oligodynamic or noble metal, principally silver, with a water-soluble polymeric material.

In accordance with this invention, I prepare a concentrated-alcohol solution of a silver salt (or salt of some other metal) in which the polymeric material is immersed for an extended period. After immersion, the material is thoroughly rinsed with alcohol to remove adherent remnants of the treatment solution. The resulting product, depending upon its character, may be used as a water-soluble powder in the preparation of antiseptic solutions, as a sheet or film with germicidal properties, as a photosensitive sheet or powder, or even as an inter-electrode separator membrane for electric batteries of the alkaline type. In the case of polyvinyl alcohol in particular, the alcoholic solution should not contain more than about 15% of water.

The reaction between high polymers having one or more hydroxyl groups and water-soluble silver salts can be greatly accelerated or promoted by the presence of a catalytic agent which, as disclosed in my aforementioned co-pending applications, may be a water-soluble acetate of an alkali metal (notably sodium or potassium acetate).

This catalytic agent is preferably incorporated in a strongly alcoholic treatment solution in which, according to another feature of this invention, the polymeric material is immersed before being treated with the silver solution, thereby avoiding any undesirable reaction between the latter and the excess catalyst.

Although the treatment in accordance with this invention will proceed at a satisfactory rate at ordinary temperatures, its progress may be greatly accelerated by heating. Particularly in the case of powdered, high-polymer material, whose structure is not detrimentally affected by temporary thermal softening, a temperature at or near the boiling point of alcohol (80° C.) may be chosen; refluxing of the solvent for an extended period, e. g. of the order of an hour, will materially increase the metal content of the final product.

The following examples will illustrate the treatment of water-soluble high polymers in accordance with this invention.

Example I 100 g. of polyvinyl alcohol powder ("Elvanol") is dispersed in 500 cc. of ethyl alcohol to which a solution of 15 g. silver nitrate $AgNO_3$ in 50 cc. of water has been added. This dispersion is heated to about 80° C. which temperature is maintained, under constant refluxing of the vapors, for 45 minutes. Thereafter, the powder is separated from the liquid by means of a paper filter and, after repeated rinsing with alcohol, is allowed to dry. The silver content is about .5%.

Example II 100 g. of polyvinyl alcohol powder is dispersed in a mixture of 500 cc. ethyl alcohol and 50 cc. of an aqueous solution containing 10%, by weight, of potassium acetate $CH_3COOK$. After five minutes' stirring at room temperature, the powder is filtered out and washed in alcohol, then treated with a mixture of ethyl alcohol and aqueous silver nitrate solution in the manner set forth in Example I. The silver content of the final product is about 5%.

Example III

A sheet of polyvinyl alcohol is immersed in a mixture of ethyl alcohol and potassium acetate solution as given in the preceding example, then rinsed with alcohol and immersed, at room temperature and for one hour, in an alcoholic silver nitrate solution as described in Example I. The entire process is carried out in a dark room and the resulting sheet material, having a silver content of about 1%, is distinctly photosensitive (changing to a dark color upon prolonged exposure to light, or upon relatively brief exposure followed by conventional development processes).

It may be mentioned that other alcohols, such as methyl, propyl or isopropyl alcohol, may be used in lieu of the ethyl alcohol mentioned above, that other soluble silver salts (e. g. silver acetate or silver sulfate) may be substituted for silver nitrate, and that sodium or lithium acetate may replace the potassium acetate of the examples. Also, the process herein disclosed may be used in the formation of metallic compounds of water-insoluble high polymers (e. g. alpha cellulose, gauze, cellophane), as an alternative to the treatment of such compounds in aqueous silver solutions as disclosed in my co-pending applications and other applications therein referred to, and in general may be applied to any high polymer having replaceable hydrogen atoms bonded to oxygen atoms, i. e. in the form of hydroxyl or carboxyl groups.

Finally, it should be noted that polyvinyl alcohol, as herein referred to, includes partially esterified compounds, such as water-soluble polyvinyl acetate.

I claim:
1. A silver polyvinyl alcoholate.
2. The process for producing a silver compound of polyvinyl alcohol which comprises the steps of preparing a concentrated-alcohol silver solution, and immersing polyvinyl alcohol in said solution for a sufficient length of time to cause said polyvinyl alcohol to exhibit an appreciable silver content.
3. The process for producing a silver polyvinyl alcoholate which comprises the steps of preparing a concentrated-alcohol solution of a water-soluble silver salt, immersing polyvinyl alcohol in said solution for a period sufficient to enable said polyvinyl alcohol to react with said silver, removing the reaction product from said solution, washing said reaction product with a monomeric alcohol, and drying said reaction product.
4. The process for producing a silver polyvinyl alcholate which comprises the steps of preparing a concen- trated-alcohol solution of a water-soluble silver salt, immersing polyvinyl alcohol powder in said solution for a period sufficient to enable said powder to react with said silver, filtering the reacted powder from said solution, washing said reacted powder with a monomeric alcohol, and drying said reacted powder.

5. The process for producing a silver polyvinyl alcholate which comprises the steps of preparing a concentrated alcohol solution of a water-soluble silver salt, immersing a polyvinyl alcohol sheet in said solution for a period sufficient to enable said sheet to react with said silver, removing the reacted sheet from said solution, washing said sheet with a monomeric alcohol, and drying said reacted sheet.

6. The process for producing a silver polyvinyl alcoholate which comprises the steps of immersing polyvinyl alcohol in a first solution of a water-soluble acetate of an alkali metal in concentrated alcohol, removing said polyvinyl alcohol from said first solution, immersing said polyvinyl alcohol in a second solution of a water-soluble silver salt in concentrated alcohol for a period sufficient to enable said polyvinyl alcohol to react with the silver of said second solution, removing the reaction product from said second solution, washing said reaction product with a monomeric alcohol, and drying said reaction product.

7. The process for producing a silver polyvinyl alcoholate which comprises the steps of immersing polyvinyl alcohol in an at least 85% alcoholic solution of a water-soluble silver salt, heating said solution to substantially its boiling point, maintaining said polyvinyl alcohol in said solution for a period sufficient to produce a reaction between said polyvinyl alcohol and said silver salt, removing the reaction product from said solution, washing said reaction product with a monomeric alcohol, and drying said reaction product.

8. The process for producing a silver polyvinyl alcoholate which comprises the steps of immersing polyvinyl alcohol in an at least 85% alcoholic solution of a water-soluble silver salt, heating said solution to substantially its boiling point, constantly refluxing the developing vapors into said solution, maintaining said polyvinyl alcohol in said solution for a period sufficient to produce a reaction between said polyvinyl alcohol and said silver salt, removing said reaction product from said solution, washing said reaction product with a monmeric alcohol, and drying said reaction product.

9. A photosensitive substance comprising a silver polyvinyl alcoholate.

10. A process for producing a silver polyvinyl alcoholate which comprises the steps of immersing polyvinyl alcohol in an at least 85% alcoholic solution of a water-soluble silver salt in a concentration of the order of 3%, by weight, heating said solution, maintaining said polyvinyl alcohol in said solution for a period sufficient to produce a reaction between said polyvinyl alcohol and said silver salt, removing the reaction product from said solution, washing said reaction product with alcohol and drying said reaction product.

11. A silver polyvinyl alcoholate containing silver in combined form in a concentration range of substantially 0.5%–5%.

References Cited in the file of this patent

UNITED STATES PATENTS

| | | |
|---|---|---|
| 2,286,215 | Lowe | June 16, 1942 |
| 2,304,252 | Hager | Dec. 8, 1942 |
| 2,373,782 | Scheiderbauer | Apr. 17, 1945 |
| 2,381,720 | Brown | Aug. 7, 1945 |
| 2,414,207 | Lowe | Jan. 14, 1947 |
| 2,518,135 | Gaver | Aug. 8, 1950 |
| 2,518,193 | Signaigo | Aug. 8, 1950 |
| 2,609,368 | Gaver | Sept. 2, 1952 |
| 2,678,885 | Porter | May 18, 1954 |